B. A. GARRETT.
COUPLING.
APPLICATION FILED JAN. 5, 1918.

1,273,764.

Patented July 23, 1918.

Inventor:
Berton A. Garrett,
by
His Attorney.

UNITED STATES PATENT OFFICE.

BERTON A. GARRETT, OF SCHENECTADY, NEW YORK, ASSIGNOR TO GENERAL ELECTRIC COMPANY, A CORPORATION OF NEW YORK.

COUPLING.

1,273,764.  Specification of Letters Patent.  Patented July 23, 1918.

Application filed January 5, 1918. Serial No. 210,444.

*To all whom it may concern:*

Be it known that I, BERTON A. GARRETT, a citizen of the United States, residing at Schenectady, county of Schenectady, State of New York, have invented certain new and useful Improvements in Couplings, of which the following is a specification.

The present invention relates to couplings for rotating shafts of the type usually termed jaw couplings. Such couplings comprise a plurality of interleaving parts having engaging driving surfaces which may slip on each other axially to permit of axial movement of the rotating shafts relative to each other to adjust parts carried by such shafts. I have found that such couplings, particularly when transmitting large loads, often fail to permit axial adjustment and that this is due to the fact that the friction between the engaging driving surfaces is so great that the force tending to produce axial adjustment is not sufficient to overcome it. In other words, the jaws of the coupling seize and the function of it as an axially adjustable coupling is lost.

The object of my invention is to provide an improved jaw coupling which will overcome the above referred-to difficulty, and to this end I make the engaging jaw surfaces of the coupling in the form of spirals, which extend in such a direction that an axial thrust is produced, tending to move the two jaws toward each other. Preferably the arrangement is such that the spiral angle approximates the angle of slipping of the metal or metals on each other. As is obvious, the spiral angle to be utilized, depends on the material or materials of the respective jaws. They may be both of the same material, or one of one material and the other of another material. Again, if found desirable, the engaging jaw surfaces may be faced with renewable pieces of suitable material.

One application of my invention where it finds particular utility is in connecting the propeller shaft of a ship to a driving motor. In such installations it is customary to provide a thrust block which takes up the axial thrust of the propeller, the coupling being located between the thrust block and the driving motor. As the thrust block wears in such an installation the axial slip jaw coupling is intended to permit the necessary axial movement of the propeller shaft relative to the motor shaft to take up the wear in the thrust block. As stated above, however, if the friction in the coupling prevents such axial adjustment then the thrust is transmitted through the coupling to the driving motor.

Figure 1:
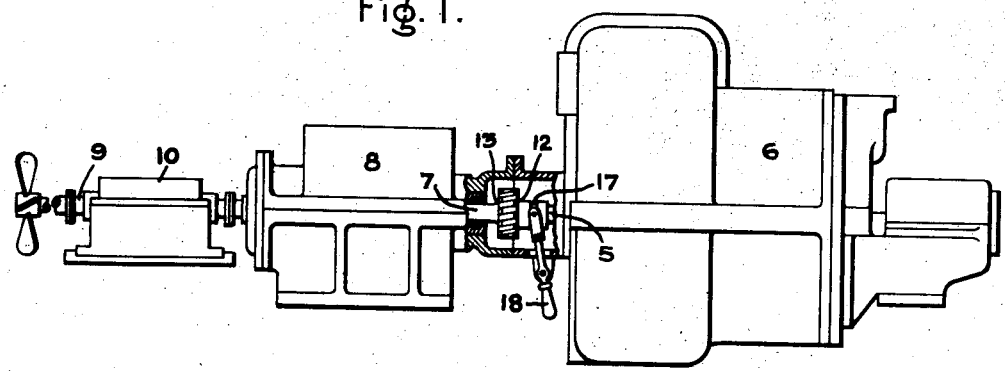
Figure 2:
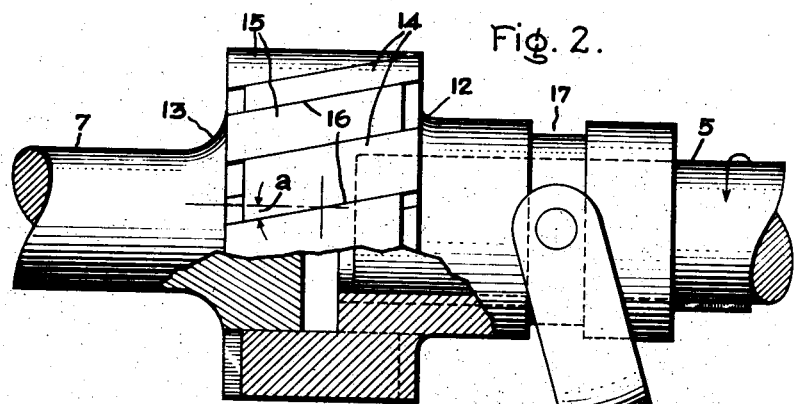
Figure 3:
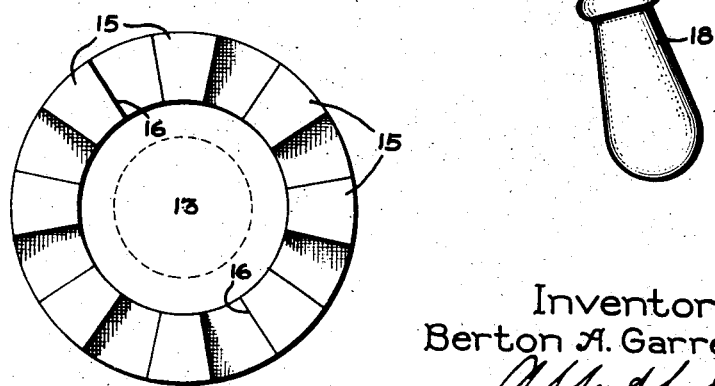

In the drawing, Figure 1 is a diagrammatic view of a motor driven propeller for a ship embodying one form of my improved jaw coupling; Fig. 2 is a view partly in section of the jaw coupling; and Fig. 3 is an end view of one of the members of the coupling.

Referring to the drawing, 5 indicates a driving shaft, in the present instance the shaft of an elastic fluid turbine 6, and 7 indicates a driven shaft which is connected through a gearing indicated at 8 to a propeller shaft 9. 10 indicates a suitable thrust block for shaft 9. Connecting the driving shaft 5 to the driven shaft 7 is a jaw coupling comprising the members 12 and 13 one carried by each shaft. Members 12 and 13 are provided with inter-leaving parts 14 and 15 having engaging driving faces or surfaces 16. As best shown in Fig. 2, these faces or surfaces 16 are of spiral form and extend at such an angle that the driving force has a component tending to move the members of the coupling toward each other or together. This angle is indicated at $a$ and, as already stated, is preferably such as to approximate the angle of slipping between the material or materials of which the engaging faces 16 are formed. With this arrangement, it will be seen, the jaw coupling will offer little if any resistance to slipping and hence will always permit the relative adjustment of the shafts.

In the present instance the coupling 12 is shown as being carried by a sleeve 17 slidable along shaft 5, 18 being a suitable handle for moving it. By moving the sleeve 17 along shaft 5, the members of the coupling may be disengaged.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A jaw coupling having the engaging surfaces of its interleaving parts extending at an angle which approximates the angle of slip between the materials of said surfaces.

2. A jaw coupling having the engaging surfaces of its interleaving parts cut in the form of spirals the angles of which approximate the angle of slip between the materials of said surfaces.

3. In combination, a driving shaft, a driven shaft, a coupling connecting them together comprising a plurality of interleaving parts having engaging surfaces which are of spiral form, the angle of the spiral approximating the angle of slip between the materials of said surfaces.

4. In combination, a driving shaft, a driven shaft, a coupling connecting them together comprising a plurality of interleaving parts having engaging surfaces which are of spiral form, the direction of the spiral being such that the force applied to the driving shaft has a component tending to move the interleaving parts axially toward each other.

In witness whereof, I have hereunto set my hand this 3rd day of January, 1918.

BERTON A. GARRETT.